United States Patent
Hicks

(10) Patent No.: US 10,167,893 B2
(45) Date of Patent: Jan. 1, 2019

(54) STOPPER ASSEMBLY FOR AN IMPLEMENT OF A MACHINE

(71) Applicant: Caterpillar Global Mining LLC, Tucson, AZ (US)

(72) Inventor: Michael Vince Hicks, Charleroi, PA (US)

(73) Assignee: Caterpillar Global Mining LLC, Tucson, AZ (US)

( * ) Notice: Subject to any disclaimer, the term of this patent is extended or adjusted under 35 U.S.C. 154(b) by 300 days.

(21) Appl. No.: 15/090,849

(22) Filed: Apr. 5, 2016

(65) Prior Publication Data
US 2017/0284456 A1    Oct. 5, 2017

(51) Int. Cl.
| E02F 3/65 | (2006.01) |
| E21F 13/02 | (2006.01) |
| F16C 11/04 | (2006.01) |

(52) U.S. Cl.
CPC ............. *F16C 11/04* (2013.01); *E02F 3/654* (2013.01); *E21F 13/025* (2013.01)

(58) Field of Classification Search
CPC ..... Y10T 403/32606; Y10T 403/32557; Y10T 403/32591; Y10T 403/32549; Y10T 403/32622; E02F 3/76; E02F 3/761; F16C 11/04

See application file for complete search history.

(56) References Cited

U.S. PATENT DOCUMENTS

| 3,735,597 | A | * | 5/1973 | Guy | B63B 35/4406 |
| | | | | | 403/113 |
| 4,090,627 | A | | 5/1978 | Teti | |
| 4,465,293 | A | | 8/1984 | McNab et al. | |
| 4,609,979 | A | * | 9/1986 | Kristofek | F21V 21/30 |
| | | | | | 362/427 |
| 5,275,525 | A | * | 1/1994 | Grumblatt | B60K 1/04 |
| | | | | | 104/34 |
| 5,873,431 | A | * | 2/1999 | Butler | B62D 12/00 |
| | | | | | 180/418 |
| 5,895,428 | A | * | 4/1999 | Berry | A61F 2/4425 |
| | | | | | 403/119 |
| 6,109,363 | A | * | 8/2000 | High | E02F 3/815 |
| | | | | | 172/820 |
| 6,719,066 | B2 | * | 4/2004 | Haringer | E02F 3/7627 |
| | | | | | 172/795 |
| 7,435,031 | B2 | * | 10/2008 | Granata | B60R 13/0206 |
| | | | | | 403/329 |
| 7,914,249 | B2 | | 3/2011 | Maynard et al. | |
| 8,292,015 | B2 | | 10/2012 | O'Quinn et al. | |
| 8,607,890 | B2 | * | 12/2013 | Liebl | E02F 3/7613 |
| | | | | | 172/821 |
| 2013/0266408 | A1 | | 10/2013 | Zutaut | |
| 2015/0089847 | A1 | * | 4/2015 | Gross | E02F 3/58 |
| | | | | | 37/445 |

* cited by examiner

*Primary Examiner* — Jonathan P Masinick

(57) ABSTRACT

A stopper assembly for a machine. The machine includes an implement. The stopper assembly includes a mount and a stopper. The mount is configured to be coupled to the machine. The stopper is configured to be pivotally coupled to the mount. The stopper is configured to restrict a pivotal movement of the implement when the stopper abuts the machine.

18 Claims, 6 Drawing Sheets

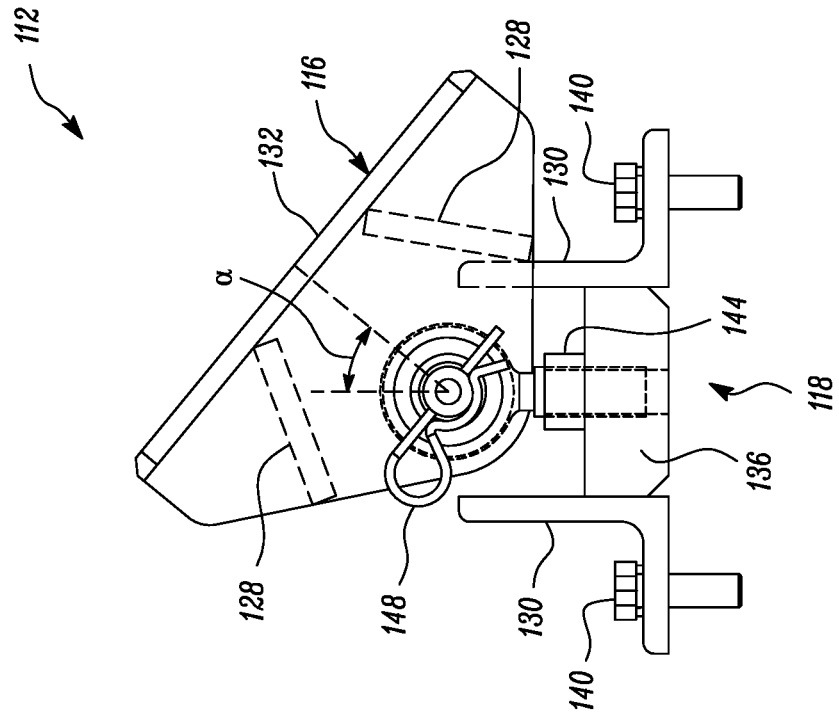
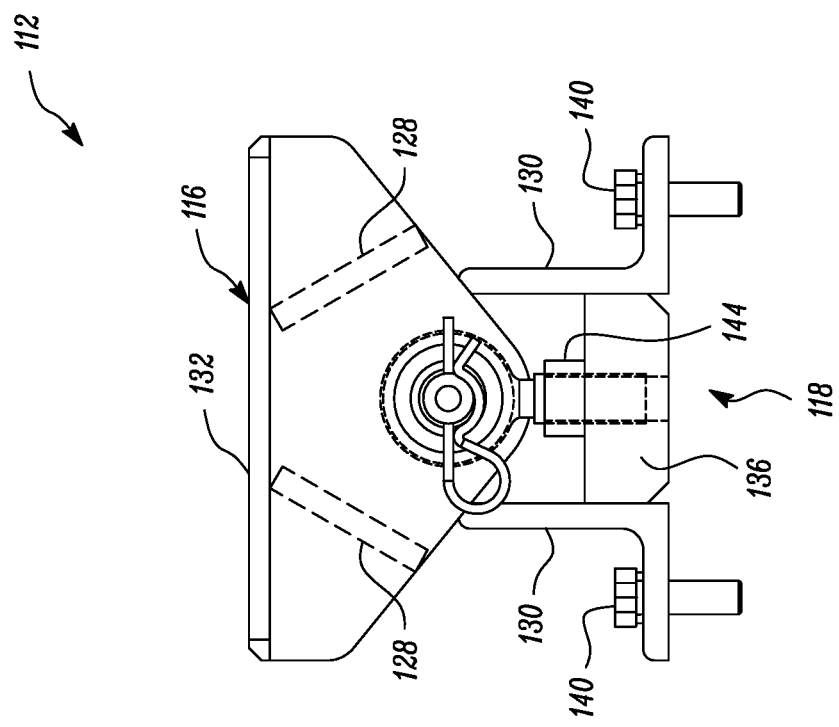

STOPPER ASSEMBLY FOR AN IMPLEMENT OF A MACHINE

TECHNICAL FIELD

The present disclosure relates generally to the field of machines. In particular, the present disclosure relates to a stopper assembly for an implement of a machine.

BACKGROUND

Machines include working implements for carrying out operations like digging, hauling etc. at any site. The working implement needs to be moved using actuating cylinders to pivot about an axis. This pivotal movement may cause accidental damage to the machine. A stopper is one such device configured to control the pivotal movement of the working implement. The stopper attempts to reduce damage to the working implement or the machine by controlling the relative movement of the working implement vis-à-vis the machine frame.

Such stoppers tend to wear out quickly on account of the significant impact forces incurred during their working. Regular maintenance and replacement of such stoppers is required resulting in an increase in operating cost. Moreover, different machines require stoppers of different sizes and shapes. The requirement also changes according to varying terrain and working conditions. For example, there might be a situation where limited ground clearance is available, or implements of smaller dimensions are required. Currently available stoppers do not offer versatility for use on different machines and also do not offer provisions for adjusting the movement of the working implement. Accordingly, custom-made stoppers are required to fit individual bucket/frame combinations.

U.S. Pat. No. 3,920,139 discloses a bucket device for a rocker shovel. The bucket device includes a body frame, a link member pivotally connected to the body frame, a bucket and a stopper. The stopper is a fixed stopper which regulates the rotation of link, so that the clockwise rotation of the link is stopped when the stopper abuts either the frame or the link.

SUMMARY OF THE INVENTION

The present disclosure provides for stopper assembly for a machine. The machine includes an implement. The stopper assembly includes a mount and a stopper. The mount is configured to be coupled to the machine. The stopper is configured to be pivotally coupled to the mount. The stopper is configured to restrict a pivotal movement of the implement when the stopper abuts the machine.

The present disclosure further provides for a stopper assembly for a machine. The machine includes an implement configured to be pivotally coupled to a machine frame. The stopper assembly includes a mount, a stopper and an adjustment structure. The mount is configured to be coupled to one of the implement or the machine frame. The stopper includes an engagement structure for pivotally coupling the stopper to the mount. The stopper is configured to restrict a pivotal movement of the implement when the stopper abuts one of the implement or the machine frame. The adjustment structure is for adjusting a distance between the engagement structure and one of the implement and the machine frame to which the mount is coupled.

In yet another aspect, an implement assembly for a machine is disclosed. The implement assembly includes an implement, a mount, a stopper and an adjustment structure. The implement is configured to be pivotally coupled to a machine frame of the machine. The mount is coupled to the implement. The stopper includes an engagement structure for pivotally coupling the stopper to the mount. The stopper is configured to restrict a pivotal movement of the implement when the stopper abuts the machine frame. The adjustment structure is for adjusting a distance between the engagement structure and the implement.

BRIEF DESCRIPTION OF THE DRAWINGS

FIG. 3A, 3B illustrate assembled views of the stopper assembly in accordance with an embodiment.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
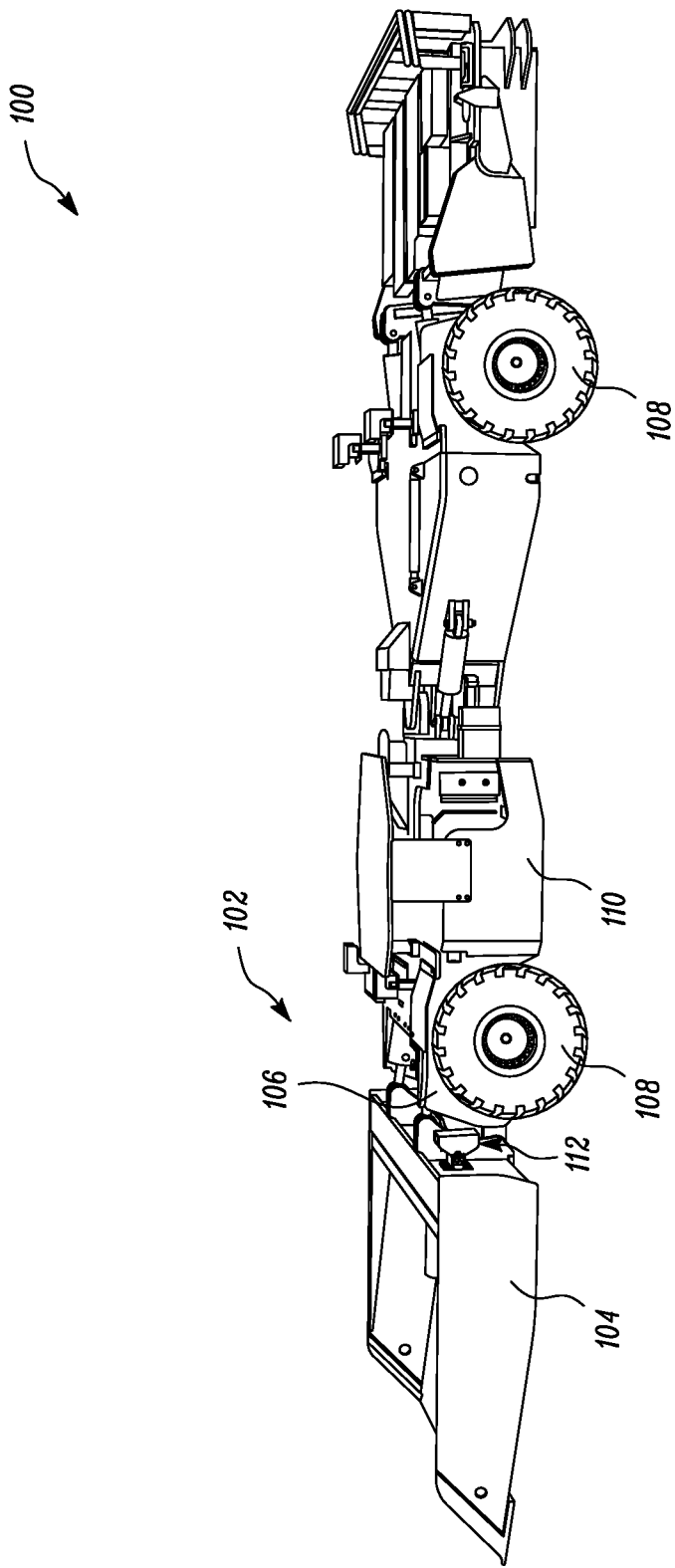
FIG. 1 illustrates a front view of a machine in accordance with an embodiment.

FIG. 1 illustrates a machine 100. The machine 100 may include any earthmover used for mining or construction purposes. The machine 100 may include an excavator, a backhoe loader, a front shovel, a wheel loader, a grapple, a mining scoop and any other type of machine that manipulates any work tool for performing one or more tasks. In an embodiment, the machine 100 is a mining scoop. The machine 100 may be battery-powered, liquid/gas fueled, hybrid or conventionally powered. The machine 100 may include an implement assembly 102.

The implement assembly 102 includes an implement 104 configured to be pivotally coupled to a machine frame 106 of the machine 100. The implement 104 may be a bucket, a linkage including one or more linkages, a forklift, a hammer, an augur or any other work tool configured to execute a particular work. The listing of the types of work tools that may be used are exemplary only and not intended to be limiting. Accordingly, it is contemplated that additional and/or different work tools than those listed may be employed without departing from the scope of the present disclosure. The machine frame 106 may include any supporting structure hosting other components. The machine frame 106 may be made of steel, aluminum, or alloys capable of supporting the machine 100. The machine frame 106 may be further supported on at least one tire 108. The at least one tire 108 may include one or more tires. The machine 100 may include a cab 110. The cab 110 may include seating arrangements (not shown) and/or an instrument console (not shown). The instrument console may be used to operate the machine 100. The implement assembly 102 includes a stopper assembly 112. The stopper assembly 112 is shown coupled to the implement 104.

Figure 2:
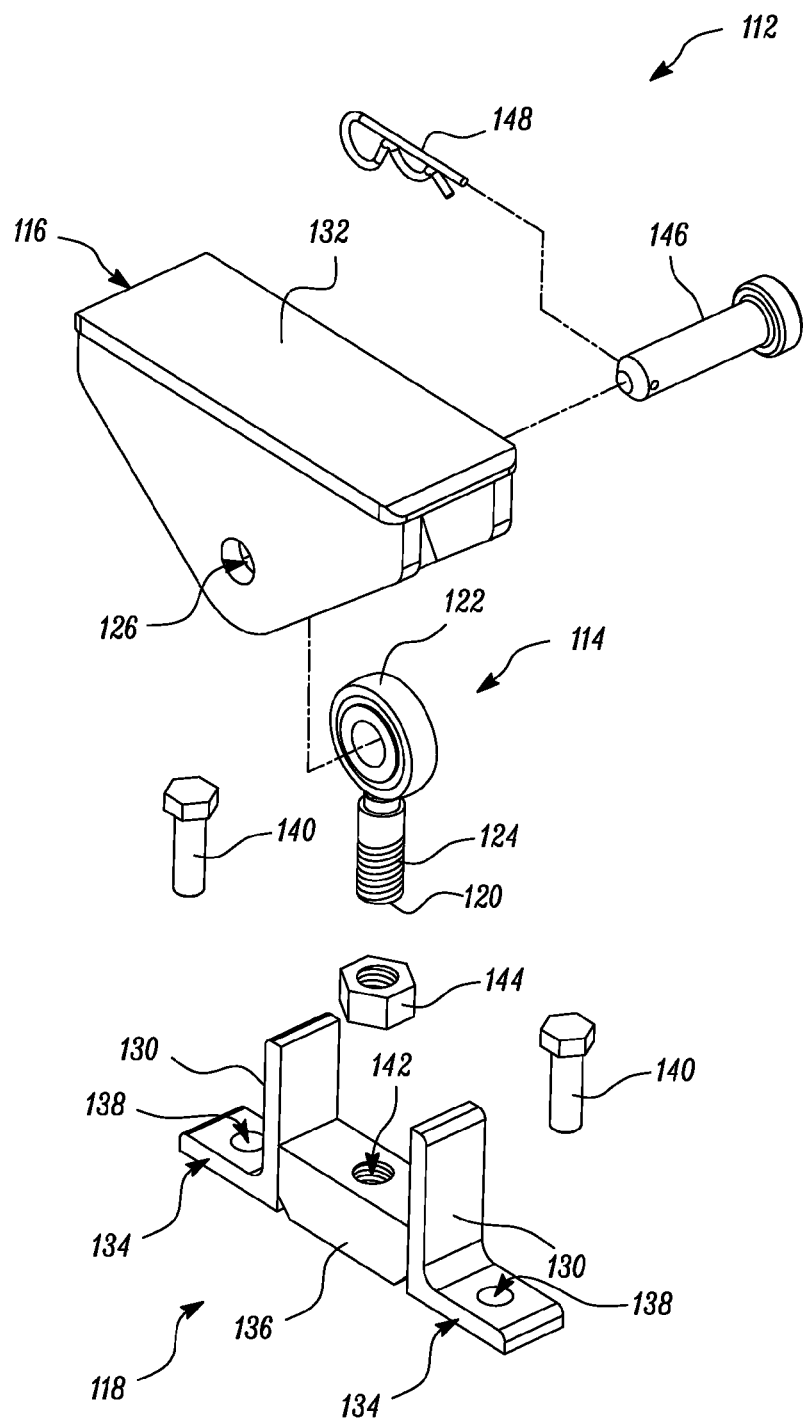
FIG. 2 illustrates an exploded view of the stopper assembly in accordance with an embodiment.

FIG. 2 illustrates an exploded view of the stopper assembly 112. The stopper assembly 112 includes a mount 114, a stopper 116 and a base member 118. The mount 114 may be configured to be coupled to the machine 100. Although, the mount 114 is shown to be made as a rod-like structure, it may be noted that mount 114 may be made of any shape. The mount 114 may include a first end 120 and a second end 122. The first end 120 may be configured to be coupled to the machine 100. It may be noted that the first end 120 is shown as a threaded structure in this embodiment and is not limited to any particular shape or construction. The second end 122 is configured to be coupled to the stopper 116. In the embodiment, the second end 122 is made of annular eye-like shape and may include other shapes capable of supporting pivotal movement of the stopper 116. This may exemplarily include rolling element bearing, jewel bearing, fluid bearing, magnetic bearings and the like.

In an embodiment, the mount 114 may further include an adjustment structure 124. The adjustment structure 124 may be also included in other components providing adjustability and its inclusion in the mount 114 may not be taken as mandatory for working of the present disclosure. For example, the adjustment structure 124 may be included in the stopper 116 or the base member 118. The adjustment structure 124 may include a threaded structure, a combination of multiple holes (not shown) in the mount 114, the stopper 116, or the base member 118, and any such structure configured to adjust distances. The adjustment structure 124 may be also interchangeably included in the mount 114, the stopper 116 and the base member 118. In an embodiment, the adjustment structure 124 may vary the distance between an engagement structure 126 and the machine 100.

The stopper 116 is configured to be pivotally coupled to the mount 114. The stopper 116 is configured to restrict a pivotal movement of the implement 104 when the stopper 116 abuts the machine 100. In an embodiment, the stopper 116 is shown generally triangular or frusto-conical in shape. It may be noted that the stopper 116 may be made circular, quadrilateral or of any other shape capable of pivoting about a point. The stopper 116 is configured to pivot up to a pre-defined angle α (shown in FIG. 3B) after abutting the machine 100. The pre-defined angle α may depend on the level of adjustment required between the machine 100 and the implement 104.

The stopper 116 may further include the engagement structure 126. The engagement structure 126 may be configured to be pivotally coupled to the mount 114. The engagement structure 126 may be a male-female arrangement, cam-follower arrangement, pivotal joint, temporary joint or other structural arrangements enabling pivoting support/motion. In the embodiment illustrated in FIG. 2, the engagement structure 126 is shown as an opening configured to be pivotally coupled to the mount 114.

As shown in FIGS. 3A and 3B, the stopper 116 also includes at least one spacer plate 128. The spacer plate 128 is configured to restrict the pivotal movement of the stopper 116 up to the pre-defined angle 'α' when the spacer plate 128 contacts the base member 118. In an embodiment, two spacer plates 128 are shown, however it may be appreciated that more than two spacer plates 128 may also be contemplated. The stopper 116 may include a surface 132 configured to abut the machine 100.

Referring to FIGS. 2, 3A and 3B, the base member 118 includes at least one angled structure 134 and a horizontal member 136. The at least one angled structure 134 includes a vertical plate 130. The at least one angled structure 134 is shown as L-shaped in this embodiment and may include a plurality of members. The angled structure 134 may include at least one hole 138 for fixing the base member 118 on either the implement 104 or the machine frame 106. A bolt 140 may be included for fixing the base member 118. The horizontal member 136 has a cavity 142 configured to receive the second end 122 of the mount 114. A jam nut 144 may be used for effecting the tightening/loosening of the mount 114 inside the horizontal member 136. In another embodiment, the base member 118 may be made in an integrated manner by merging the angled structure 134 and the horizontal member 136. The base member 118 may be made of any material capable of supporting combined weights of the implement 104, the machine frame 106 and other applicable forces.

The stopper assembly 112 may further include a pin 146 for coupling the engagement structure 126 to the second end 122 of the mount 114. The pin 146 may also include bolts and other fasteners capable of allowing pivoting motion of the stopper assembly 112 while avoiding disengagement of the engagement structure 126 and the second end 122. A fastener 148 may be used to lock the pin 146. It may be noted that any other fastener or constructional element may be used to replace the fastener 148 and the shape as such is not limiting.

Figure 4:
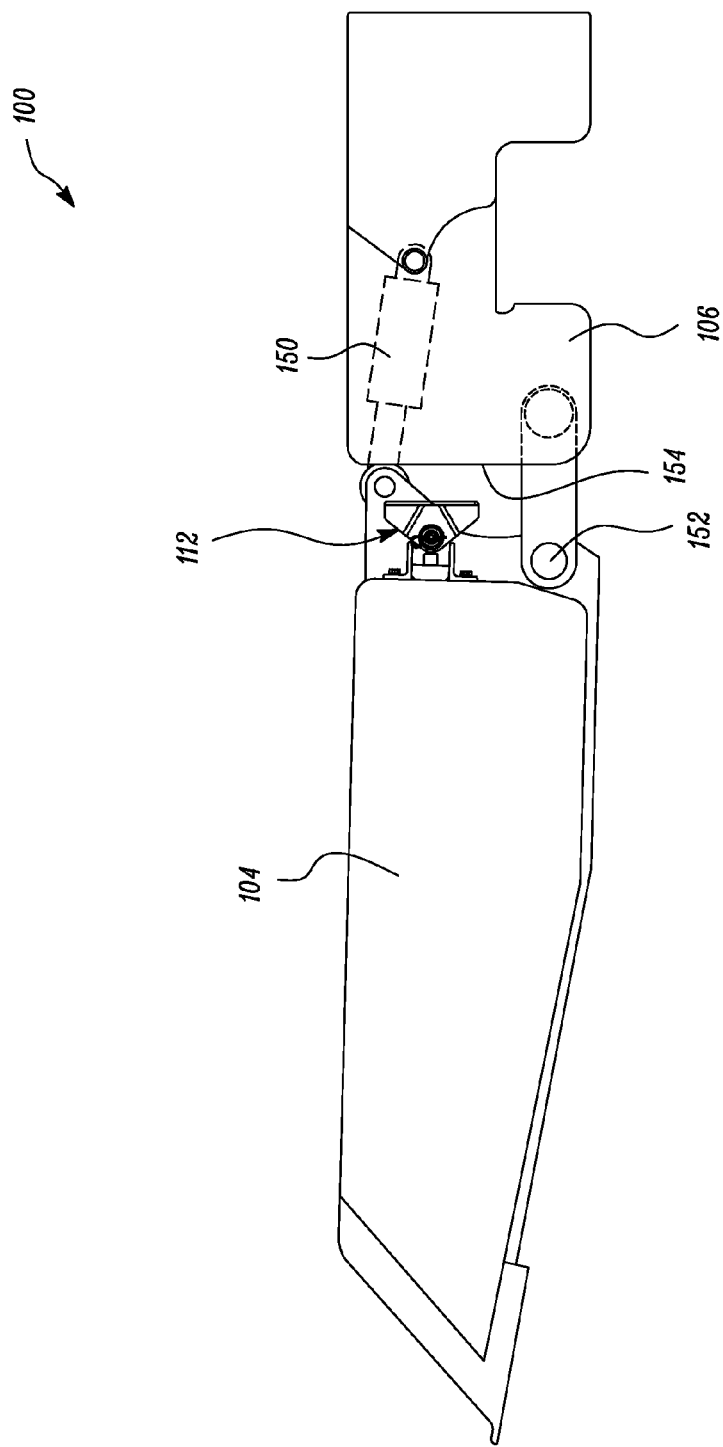
FIG. 4 illustrates a partially enlarged front view of the machine in accordance with an embodiment.
Figure 5:
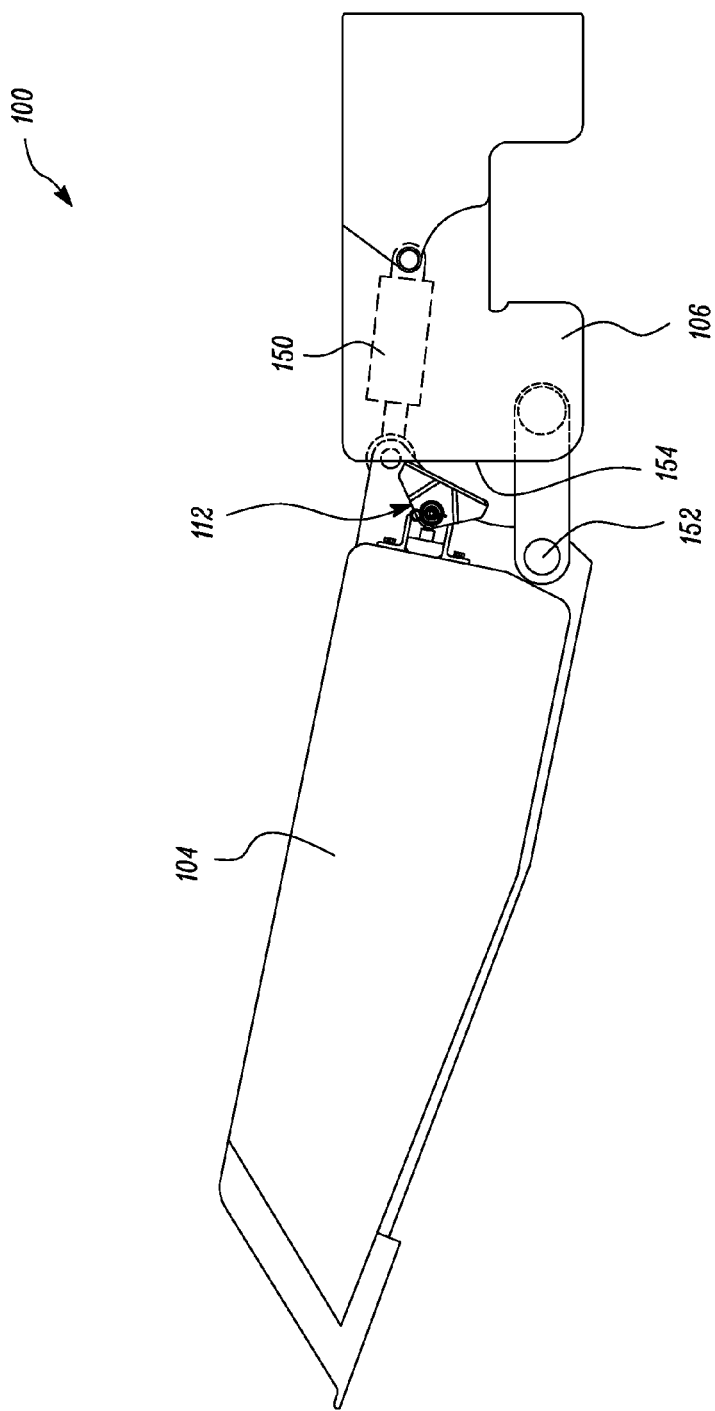
FIG. 5 illustrates a partially enlarged front view of the machine in accordance with an embodiment.
Figure 6:
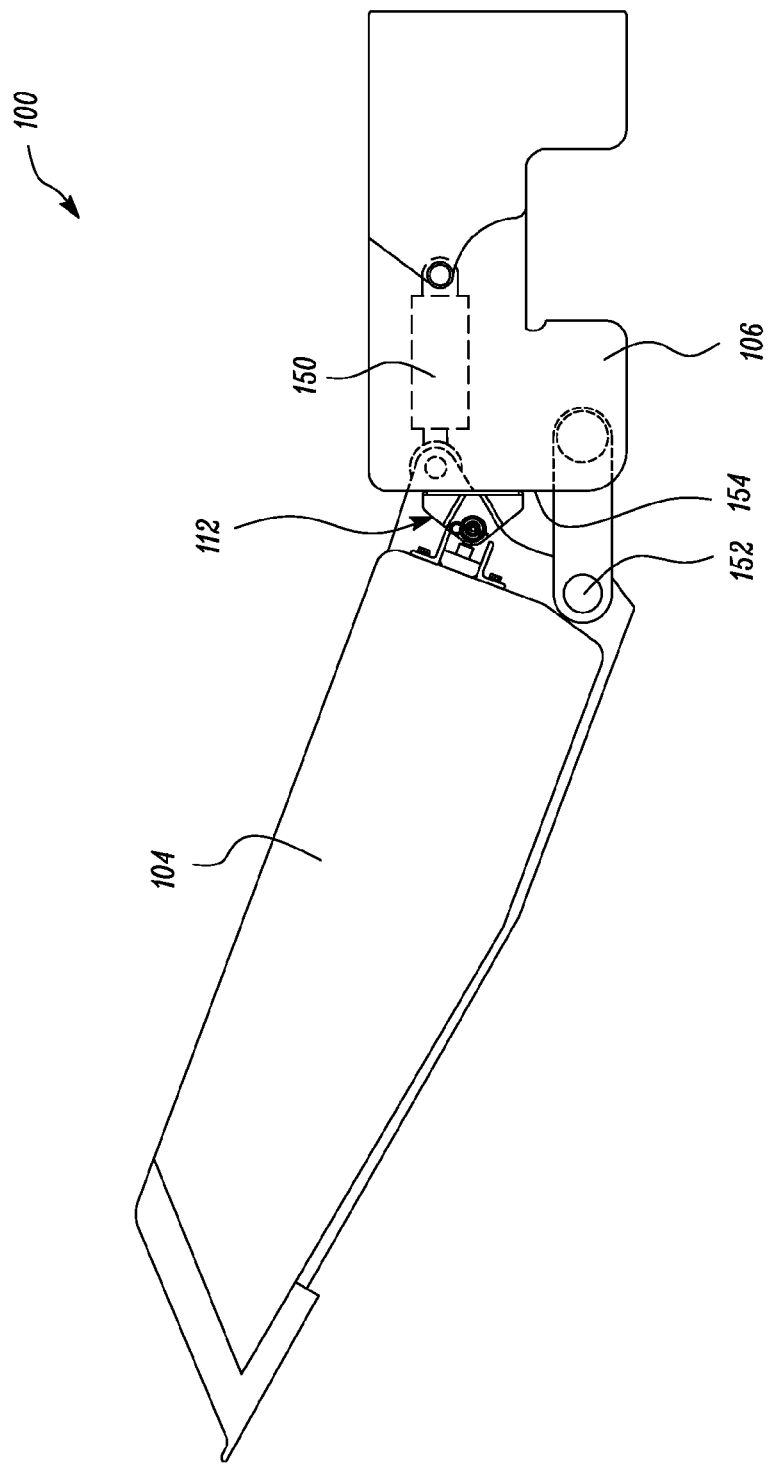
FIG. 6 illustrates a partially enlarged front view of the machine in accordance with an embodiment.

Referring to FIG. 4, FIG. 5 and FIG. 6, a partial enlarged view of the machine 100 is shown. The machine 100 additionally includes at least one actuating cylinder 150. The at least one actuating cylinder 150 may include plurality of cylinders. A hinge joint 152 may be included about which the implement 104 may be pivoted. An abutting edge 154 is shown on the machine frame 106 of the machine 100. The abutting edge 154 is the portion of the machine frame 106 wherein the stopper assembly 112 abuts, and eventually restricts the pivotal motion of the implement 104.

INDUSTRIAL APPLICABILITY

The present disclosure discloses the stopper assembly 112 for the implement 104 of the machine 100. The disclosure provides for regulating the movement of the implement 104 by restricting the pivotal movement of the stopper assembly 112. The stopper assembly 112 is shown as coupled to the implement 104. It may be noted that the placement of the stopper assembly 112 on either the implement 104 or the machine frame 106 of the machine 100 does not alter the working of the stopper assembly 112. The disclosure provides for the implement 104 coupled to the machine frame 106 and capable of movement using the actuating cylinder 150. The actuating cylinder 150 may be powered using hydraulic, pneumatic or other such means provided on-board or off-board the machine 100. The machine 100 is propelled using the tire 108 and controlled using the console (not shown) provided inside the cab 110. FIG. 4 shows the implement in a normal position wherein the actuating cylinder 150 is not activated.

In an aspect of the present disclosure, the stopper assembly 112 is shown in a semi-actuated position in FIG. 5. The actuating cylinder 150 is retracted and thereby the implement 104 is pivoted around the hinge joint 152. As shown, the surface 132 of the stopper 116 may abut the machine frame 106. More specifically, the surface 132 may come in contact with the abutting edge 154 of the machine frame 106. As the stopper 116 of the stopper assembly 112 is capable of pivotal motion, the abutting does not immediately restrict the motion of the implement 104. As the movement of the implement 104 is continued using the actuating cylinder 150, the stopper 116 starts pivoting around the engagement structure 126. Furthermore, the adjustment structure 124 may be used to manipulate the distance between the engagement structure 126 and the machine 100.

This provides the advantage of standardizing stoppers for any machine range and for all working conditions. For example, any addition/reduction in the ground clearance of the machine 100 or the availability of operating range requires respective changes using the adjustment structure 124. This also supports any retrofitting of existing machines and thus may serve complete product ranges.

In yet another aspect of the present disclosure (referring to FIG. 6), the surface 132 of the stopper 116 has completely come in contact with the abutting edge 154 of the machine frame 106 as a result of further retraction of the actuating cylinder 150 and movement of the bucket in a fully-actuated position. Furthermore, the stopper has pivoted up to a pre-defined angle 'α' and the spacer plate 128 has abutted the vertical plate 130 of the base member 118. Eventually, the stopper 116 restricts the pivotal movement of the implement 104 and avoids its bottoming out.

Furthermore, the pivoting nature of the stopper 116 avoids the possibility of sudden impacts affecting the implement 104, the frame 106, or the stopper assembly 112 is avoided. The adjustment structure 124 of the stopper assembly 116 further avoids the necessity of immediate replacement of stopper 116 in cases of low or mild wear. This is possible because the mount 114 is capable of moving towards or away from the machine 100. This enhances the overall longevity of the machine 100 with lesser replacements.

What is claimed is:

1. A stopper assembly for a machine, the machine comprising an implement, the stopper assembly comprising:
   a mount configured to be coupled to the machine;
   a stopper including an engagement structure pivotally coupled to the mount configured to be pivotally coupled to the mount, the stopper configured to restrict a pivotal movement of the implement when the stopper abuts the machine;
   wherein the mount includes an adjustment structure to adjust a distance between the engagement structure and the machine.

2. The stopper assembly of claim 1, wherein the stopper assembly further comprises a base member configured to be coupled to the machine, wherein the mount is configured to be coupled to the base member.

3. The stopper assembly of claim 2, wherein the mount is adjustably coupled to the base member such that the mount is capable of movement towards or away from the machine.

4. The stopper assembly of claim 1, wherein the stopper comprises at least one spacer plate configured to restrict the pivotal movement of the stopper relative to the mount.

5. The stopper assembly of claim 1, wherein the stopper is configured to pivot up to a pre-defined angle after abutting the machine.

6. The stopper assembly of claim 1, wherein the adjustment structure is a threaded structure.

7. A stopper assembly for a machine, the machine comprising an implement configured to be pivotally coupled to a machine frame, the stopper assembly comprising:
   a mount configured to be coupled to one of the implement or the machine frame;
   a stopper having an engagement structure for pivotally coupling the stopper to the mount, the stopper configured to restrict a pivotal movement of the implement when the stopper abuts one of the implement or the machine frame; and
   an adjustment structure for adjusting a distance between the engagement structure and one of the implement and the machine frame to which the mount is coupled.

8. The stopper assembly of claim 7, wherein the stopper assembly further comprises a base member configured to be coupled to the one of the implement or the machine frame.

9. The stopper assembly of claim 8, wherein the mount is adjustably coupled to the base member such that the mount is capable of movement towards or away from the machine.

10. The stopper assembly of claim 7, wherein the stopper comprises at least one spacer plate configured to restrict the pivotal movement of the stopper relative to the mount.

11. The stopper assembly of claim 7, wherein the stopper is configured to pivot up to a pre-defined angle after abutting the other of the implement or the machine frame.

12. The stopper assembly of claim 7, wherein the adjustment structure is a threaded structure.

13. An implement assembly for a machine comprising:
   an implement configured to be pivotally coupled to a machine frame of the machine;
   a mount coupled to the implement;
   a stopper having an engagement structure for pivotally coupling the stopper to the mount, the stopper configured to restrict a pivotal movement of the implement when the stopper abuts the machine frame; and
   an adjustment structure for adjusting a distance between the engagement structure and the implement.

14. The implement assembly of claim 13, wherein the stopper further comprises a base member configured to be coupled to the implement.

15. The stopper assembly of claim 14, wherein the mount is adjustably coupled to the base member such that the mount is capable of movement towards or away from the machine.

16. The stopper assembly of claim 13, wherein the stopper is configured to pivot up to a pre-defined angle after abutting the machine frame.

17. The stopper assembly of claim 13, wherein the stopper comprises at least one spacer plate configured to restrict the pivoting of the stopper relative to the mount.

18. The stopper assembly of claim 13, wherein the adjustment structure is a threaded structure.

* * * * *